United States Patent [19]
Tam

[11] Patent Number: 5,815,195
[45] Date of Patent: Sep. 29, 1998

[54] SUBSCRIBER INFORMATION MAINTENANCE SYSTEM AND METHODS

[75] Inventor: Simon Tam, Issaquah, Wash.

[73] Assignee: Microsoft Corporation, Redmond, Wash.

[21] Appl. No.: 643,332

[22] Filed: May 6, 1996

[51] Int. Cl.⁶ ..................................................... H04N 7/14
[52] U.S. Cl. .................................. 348/13; 348/12; 348/7; 348/3; 455/2; 455/4.2
[58] Field of Search ............................. 348/13, 12, 6–11, 348/14–15, 3, 7; 455/4.1, 4.2, 5.1, 6.1, 6.2, 6.3, 2

[56] References Cited

U.S. PATENT DOCUMENTS

| | | | |
|---|---|---|---|
| 5,619,251 | 4/1997 | Kuroiwa et al. | 348/12 |
| 5,640,196 | 6/1997 | Behrens et al. | 348/14 |
| 5,640,453 | 6/1997 | Schuchman et al. | 348/7 |
| 5,654,747 | 8/1997 | Ottesen et al. | 455/5.1 |
| 5,682,195 | 10/1997 | Hendricks et al. | 348/12 |
| 5,729,549 | 3/1998 | Kostreski et al. | 348/7 |

*Primary Examiner*—Tommy P. Chin
*Assistant Examiner*—Vu Le
*Attorney, Agent, or Firm*—Lee & Hayes, PLLC

[57] ABSTRACT

An interactive video entertainment distribution network utilizing a subscriber information maintenance system wherein the subscriber information maintenance system comprises a set-top box (STB) at the premises of an individual subscriber. A service provider headend is connected for video and bi-directional data communications with the STB, and to provide enhanced services and traditional video programming to the subscriber through the STB. A billing and subscriber management system (BSMS) maintains a BSMS database with billing information regarding individual subscribers and with information regarding traditional video programming provided to such subscribers. An interactive subscriber services program (ISS) maintains an ISS database with additional information related to enhanced services provided to individual subscribers that is not included in the BSMS database. An interactive application program executes on the STB. The interactive application program communicates with the ISS to access and modify information from the two databases. The BSMS has a program interface that allows the ISS to access and modify information from the BSMS database. The ISS has data handling routines that execute in response to requests by the interactive application program to access or modify subscriber and service information, The data handling routines use the program interface of the BSMS to reference the information if it is part of the first database. The data handling routines and the program interface of the BSMS allow the service provider to utilize an existing billing and subscriber management system in conjunction with enhanced services.

22 Claims, 3 Drawing Sheets

SUBSCRIBER INFORMATION MAINTENANCE SYSTEM AND METHODS

TECHNICAL FIELD

This invention relates to cable television networks and in particular to entertainment distribution networks offering enhanced video-based services such as video-based services that are interactive with service subscribers.

BACKGROUND OF THE INVENTION

FIG. 1 shows a video entertainment distribution network or CATV (cable television) system, generally designated by the reference numeral 10. CATV system 10 includes a headend 12 that is responsible for broadcasting video and data to all subscribers connected to the system. A headend might support from a few hundred homes in a rural area to hundreds of thousands of homes in a metropolitan area. Headend 12 is connected to multiple neighborhood nodes 14 by trunk lines 16. Traditional trunk lines include microwave links and coaxial cables, often associated with repeaters 17. Each neighborhood node serves the homes of a limited neighborhood area. In many systems, however, neighborhood nodes might each serve several thousand homes.

From the neighborhood nodes, connections to homes are made through coaxial plants 18. A coaxial plant comprises multiple active coaxial feeders 19, each tapped by multiple passive coaxial drop cables that reach individual subscribers.

Traditionally, networks such as the one shown utilize a one-way delivery system. Such a system delivers what is referred to herein as traditional video programming. Traditional video programming consists of a number of channels which are broadcast to every subscriber according to a preset time schedule. With this type of programming, a subscriber's viewing choices are limited to a selection of one or more of the available channels for viewing. The viewer generally has no choice as to the scheduling of any particular video programming.

In newer systems, communications channels are provided in both upstream and downstream directions. In addition, more sophisticated digital communications protocols are employed so that subscribers can each receive their own data streams. This allows cable distribution systems to provide services beyond traditional broadcast services.

In many cases, cable subscribers will have available a private, bi-directional, digital communications channel with a cable headend. The subscribers will be able to use this private channel not only for receiving traditional television video and audio, but also for interactive tasks such as shopping, banking, and information retrieval. Another use of such bi-directional digital communications will be for entertainment services such as movies-on-demand, where a viewer will be able to pick from a large library of movie titles and to request any of those movie titles for viewing in accordance with the subscriber's own schedule. Such additional services, beyond traditional broadcast services, are referred to herein as enhanced services.

To make use of these extended cable services, a subscriber interface device or unit 30 (often referred to as a set-top box or STB) such as shown in FIG. 2, is connected in a viewer's home to a video display device such as a television 32. The STB provides an interface between the viewer and cable headend 12. If a viewer wants to watch a broadcast TV channel, the STB requests a digital feed of the TV channel and displays the broadcast channel on the viewer's TV.

Other services are available as software applications that are downloaded from the headend and executed on the STB itself. For instance, a shopping service is available through a user interface or front-end which executes on the STB itself. Similarly, movies-on-demand are selectable only through a user interface which runs on the STB. Rather than storing all possible applications at the STB, the applications are stored at the headend and downloaded only as necessary. In many cases, a remote control device 34 is used to provide operator instructions to the headend through whatever application program is running on STB 30.

For an individual cable provider, adding enhanced services to its traditional broadcast offerings will not be simple. In some cases, very significant upgrades to the physical distribution plant will be required to offer enhanced services. In addition, significant new software will be required by most providers, both to generate and oversee the new services.

Among the software elements that will require significant upgrading is the cable provider's billing and subscriber management system (BSMS). A BSMS is a supervisory program that keeps track of all cable subscribers—including billing information and data regarding services provided to such subscribers. A BSMS maintains a database with information such as names and addresses of subscribers, types of service being provided, billing amounts, and payment amounts.

There are several BSMS's that are used widely in the cable industry, such as those from Suntech Systems and Cabledata. While these systems are very capable when used in conjunction with traditional broadcast video services, they are not designed to keep track of additional information relating to the much more sophisticated interactive services currently being proposed and designed for use with cable and cable-type distribution networks. However, it would be desirable to somehow utilize the significant development that has been invested in these systems, and to avoid the necessity of re-designing each of the popular BSMS's for use with enhanced video-based services.

Cable operators themselves will have a strong desire to continue using the same BSMS's even after their facilities have been upgraded to provide enhanced video-based services. Re-training BSMS operators would cause a significant burden in the form of service disruptions and expense.

From the standpoint of suppliers of cable upgrade systems, there is a desire for such upgrade systems to be compatible with existing BSMS's. It is not desirable or practical, however, to require each BSMS supplier to significantly modify its product.

SUMMARY OF THE INVENTION

The invention described below meets the needs of cable operators, BSMS suppliers, and the manufacturers of systems for supplying enhanced video-based services. The invention utilizes existing BSMS products with little or no modification, while also adding significant functionality which can be exploited by interactive applications running on individual STBs.

In the preferred embodiment of the invention, the BSMS maintains a primary or legacy database in accordance with past practice. This database contains information related to traditional video programming. In addition, an interactive subscriber services program (ISS) executes at the headend and maintains a secondary database. This database includes information related to enhanced services that is not normally part of the primary or legacy database maintained by the BSMS.

The interactive subscriber services program receives data requests from application programs running on individual STBs. In response, the interactive subscriber services program accesses data from either the primary or secondary database, depending on where the requested data resides. If the data resides in the first database, maintained by the BSMS, the ISS calls a program interface provided by the BSMS manufacturer to access the data. If the data resides in the second database, the ISS accesses the data with its own routines.

The ISS provides one or more program interfaces so that new interactive services can be provisioned by the BSMS. The BSMS can call these interfaces as required.

DETAILED DESCRIPTION OF THE PREFERRED EMBODIMENT

Figure 1:
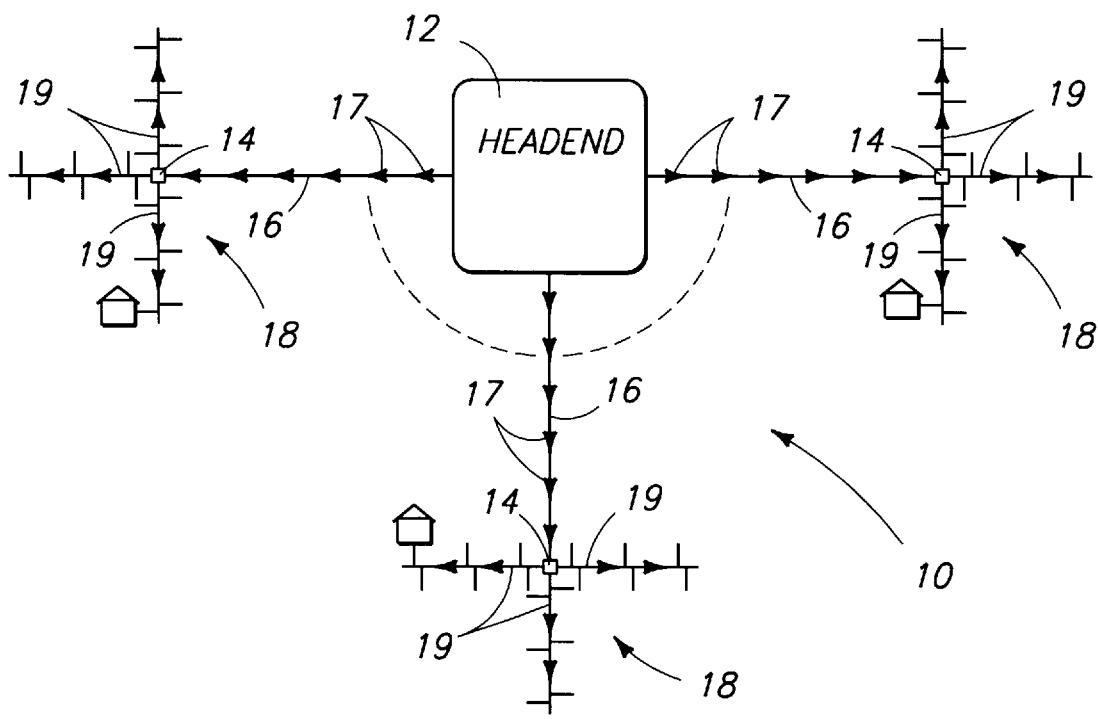
FIG. 1 is a block diagram of a video entertainment distribution network.
Figure 2:
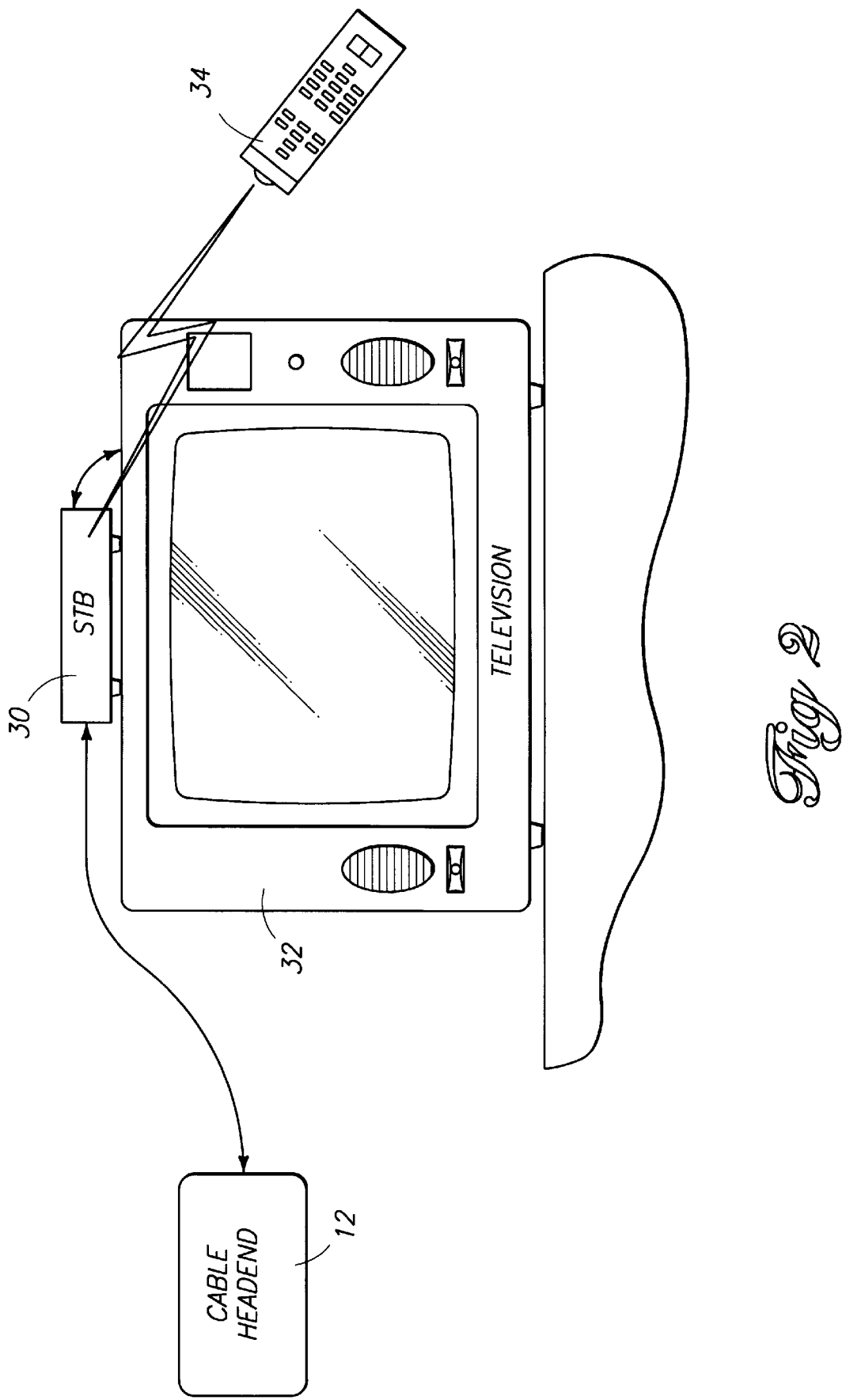
FIG. 2 is a block diagram of a television and set-top box used in conjunction with the video entertainment network of FIG. 1.

The invention is a subscriber information maintenance system in an interactive video entertainment distribution network such as the one described with reference to FIGS. 1 and 2. It includes subscriber interface units or STBs 30 at the premises of individual subscribers, and a service provider headend 12 connected for video and bi-directional data communications with the STBs. The headend provides enhanced services as well as traditional video programming to individual subscribers through their STBs.

Figure 3:
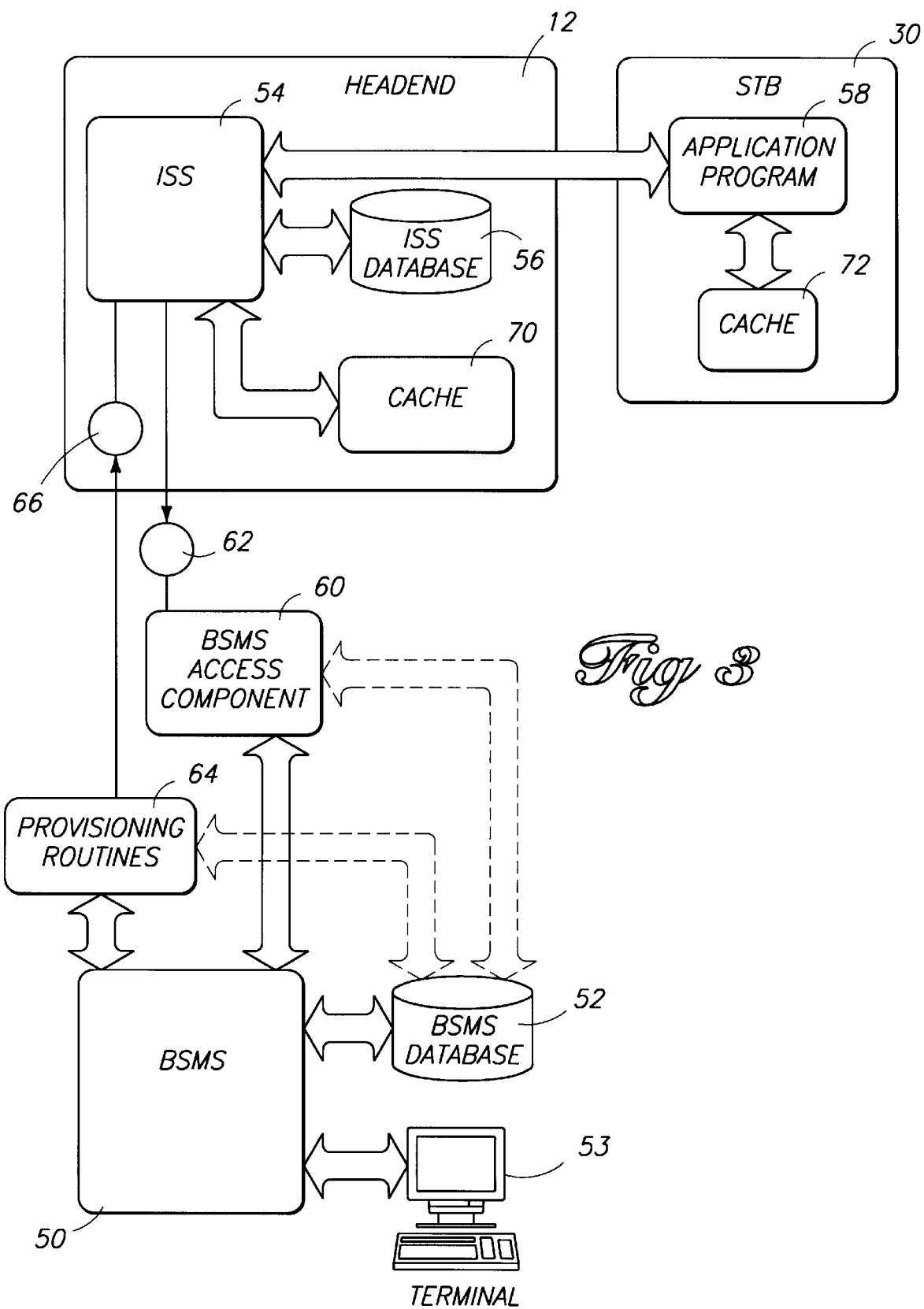
FIG. 3 is a block diagram of a subscriber information maintenance system in accordance with a preferred embodiment of the invention.

As shown in FIG. 3, the invention includes a billing and subscriber management system (BSMS) 50 that maintains a first set of information or data in the form of a first database 52. BSMS 50 can be any one of a number of popular and well-known BSMS products, such as one of those listed above, that maintains operational information for traditional cable services. Such information includes billing information regarding individual subscribers and other information regarding traditional video programming provided to such subscribers. One or more operator terminals 53 are used in conjunction with BSMS 50. Customer service representatives use operator terminals to access and modify information about cable subscribers contained in first database 52. The BSMS can be located at the headend or it can be located elsewhere while remaining in communication with the headend.

The invention also includes an interactive subscriber services program (ISS) 54 that maintains a second set of information or data in the form of a second database 56. ISS 54 is a program that tracks information regarding enhanced services provided to subscribers. In general, this is information that is not included in the first database maintained by BSMS 50. ISS 54 preferably executes at headend 12.

The invention further includes a plurality of different interactive application programs 58 that execute on STBs 30. Such programs comprise executable software modules such as electronic programming guides, operator interfaces for movies-on-demand applications, online shopping applications, and other interactive modules. Programs 58 typically are downloaded from the headend as necessary for execution on a particular STB.

The following is an overview of several types of information that might be requested of ISS 54 by an application program executing on an STB:

Subscribers—Profiles of the persons, organizations, or corporations that subscribe to the service and pay the monthly bill.

Viewers—Profiles of individuals in a subscriber's household. Different preferences and operating parameters may be set for different viewers within a particular household.

Locations—There are at least two addresses that are associated with a subscriber: service location and billing address.

Devices—Information about the equipment on a subscriber's premises, including STBs, TVs, VCRs, and printers.

Work Order Information—Records of work orders.

Franchise Information—basic information about the cable provider that a viewer can access with a particular interactive application program 58.

Some of this information might be included in the database of a particular BSMS. For example, subscriber, location, work order, and franchise information would typically be found in a BSMS database. Viewer and device information, on the other hand, would not usually be kept by a typical BSMS. Viewer information might include privileges, privacy preferences, and security information for individual viewers. Device information includes specifications for different types of equipment at the subscriber's premises. This information is maintained by ISS 54.

Various different application programs 58, executing on an STB, utilize information from the two databases. To do this, they communicate with ISS 54 to request access to specific information items. In such requests, each different information item is specified and identified by a unique ID number or code.

ISS 54 has data handling routines that execute in response to requests by an interactive application program 58 to access or modify specific subscriber and service information. In response to a request by an interactive application program 58 to reference a specific information item, ISS 54 references BSMS database 52 if the information item is part of that database. ISS 54 references ISS database 56 if the information item is part of that database.

ISS 54 determines whether a specific information item is part of the ISS or the BSMS database by examining the ID number of the information item. In the preferred embodiment, a specific bit of the ID number is used to specify whether the associated information item belongs to the first or second database. Alternative embodiments make the determination by comparing the ID number against a list or a known range of ID numbers corresponding to information items from one or the other of the databases.

Communications between ISS 54 and BSMS 50 is through program interfaces, the specific embodiments of which are implemented in accordance with the Component Object Model (COM) as described in a book entitled "Inside OLE, Second Edition," by Kraig Brockschmidt, published by Microsoft Press of Redmond, Wash. (1995). This book is hereby incorporated by reference. A BSMS access component 60 is provided for accessing data from BSMS database 52. Access component 60 implements one or more program interfaces 62 that allow ISS 54 to access and modify information from BSMS database 52. Access component 60 can be integrated with the BSMS itself, or operate independently of the BSMS to access BSMS database 52 as shown by the dashed path of FIG. 3 between access component 60 and BSMS database 52. In many cases, the BSMS database will be implemented using a client-server architecture. In such a case, access component 60 can access the database directly, without the cooperation of the BSMS itself.

Similarly, BSMS 50 has provisioning routines 64 that execute in response to data input by customer service operators from operator terminal 53 to access or modify information from ISS database 56. ISS 54 has a program interface 64 that allows BSMS 50 such access. Alternatively, the provisioning routines might be called from a database server, as shown by the dashed communications path between provisioning routines 64 and BSMS database 52.

As a further, optional improvement, ISS maintains a cache 70 of frequently used information items from BSMS database 52. This speeds retrieval operations for those data item that are accessed repeatedly and often by ISS 54. Whether an information item is cached in this manner is indicated by the ID number of the information item. For example, the combination of two bits from the ID number are used to indicate whether a specific information item is located at the ISS, at the BSMS, or both (as when the information item is in cache 70). A lookup table or range specification can also be used to determine the storage details of an information item referred to by a particular ID number.

While the invention is described above in term of its various hardware and software components, the invention also encompasses methodological steps of maintaining subscriber-related information in an interactive video entertainment network. Such steps include providing enhanced services and traditional video programming to subscribers through a subscriber interface device at the promises of an individual subscriber. A further step includes utilizing an existing third-party BSMS to maintain a BSMS database with billing information regarding individual subscribers and with information regarding traditional video programming provided to such subscribers. The invention further includes running an ISS program in addition to the existing billing and subscriber management system to maintain an ISS database with information regarding enhanced services provided to individual subscribers. Another step in accordance with the invention comprises running an interactive application program on the subscriber interface unit of the individual subscriber. The interactive application program requests references to information items through the ISS.

Preferred steps further include adding a program interface to work in conjunction with the existing BSMS to allow the ISS to access and modify information from the BSMS database. The ISS performs a step of using the program interface of the BSMS to reference the specific information item if it is part of the BSMS database.

The preferred embodiment of the invention further comprises implementing a program interface in the ISS that allows the BSMS to access and modify information from ISS database. The BSMS performs a step of provisioning enhanced services for an individual subscriber from the ISS using the program interface of the ISS.

In operation, database information can be viewed and/or changed either by a subscriber through an application program 58, or by a customer service representative through an operator terminal 53 and BSMS 50. For a subscriber to view or change a specific information item, application program 58 makes a request through ISS 54 using an ID number corresponding to the information item. On the basis of the ID number, ISS 54 performs a step of determining whether the requested information item is part of the ISS database, the ISS cache, or the BSMS database. If the information is part of the database maintained by the BSMS, the ISS performs a further step of referencing the BSMS database to obtain the requested information item. Access in this case is through program interface 62. If the information is part of the ISS cache or of the database maintained by the ISS, the ISS performs a step of referencing the cache or ISS database to obtain the requested information. In this case, access is through routines internal to ISS 54. To further speed operations at STB 30, the STB maintains its own local cache 72 of the most frequently accessed information items from both ISS database 56 and from BSMS database 52.

The preferred embodiment of the invention enables a cable service provider to offer enhanced, interactive services while at the same time allowing the service operator to utilize an existing BSMS in conjunction with such enhanced services. In the preferred embodiment of the invention, interfaces are pre-defined both to access the BSMS from the ISS and to access the ISS from the BSMS. In this way, the ISS can be designed to operate in conjunction with any BSMS. A BSMS vendor is required only to provide a BSMS access component and provisioning routines to enable operation of the BSMS with the ISS.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A subscriber information maintenance system for use in an interactive video entertainment distribution network, comprising:

a subscriber interface device at the premises of an individual subscriber;

a service provider headend connected for video and bi-directional data communications with the subscriber interface device, the service provider headend providing enhanced services and traditional video programming to the subscriber through the subscriber interface device;

a billing and subscriber management system that maintains a first set of information with billing information regarding individual subscribers and with information regarding traditional video programming provided to such subscribers;

an interactive subscriber services program that maintains a second set of information regarding enhanced services provided to individual subscribers, wherein the second set of information is different than the first set of information;

an interactive application program executing on the subscriber interface device, the interactive application program communicating with the interactive subscriber services program to access and modify specific information items from the first and second sets of information without specifying whether the specific information items are maintained by the billing and subscriber management system or by the interactive subscriber services program;

in response to a request by the interactive application program to reference a specific information item, the interactive subscriber services program referencing the first set of information if the specific information item is part of the first set of information maintained by the billing and subscriber management system, the interactive subscriber services program referencing the second set of information if the specific information item is part of the second set of information maintained by the interactive subscriber services program.

2. A system as recited in claim 1, the billing and subscriber management system responding to instructions from customer service operators to access or modify information from the first set of information.

3. A system as recited in claim 1, wherein the second set of information further includes a cache of frequently used information items from the first set of information.

4. A system as recited in claim 1, wherein the interactive application program maintains a cache of the most frequently accessed information items from the first and second sets of information.

5. A subscriber information maintenance system for use in an interactive video entertainment distribution network, comprising:

a subscriber interface device at the premises of an individual subscriber;

a service provider headend connected for video and bi-directional data communications with the subscriber interface device, the service provider headend providing enhanced services and traditional video programming to the subscriber through the subscriber interface device;

a billing and subscriber management system that maintains a first database with billing information regarding individual subscribers and with information regarding traditional video programming provided to such subscribers;

an operator terminal for use in conjunction with the billing and subscriber management system to access and modify the first database;

an interactive subscriber services program that maintains a second database with additional information related to enhanced services provided to individual subscribers that is not included in the first database;

an interactive application program executing on the subscriber interface device, the interactive application program communicating with the interactive subscriber services program to access and modify information from the first and second databases;

the billing and subscriber management system having a program interface that allows the interactive subscriber services program to access and modify information from the first database;

the interactive subscriber services program having data handling routines that execute in response to requests by the interactive application program to access or modify specific subscriber and service information, the data handling routines using the program interface of the billing and subscriber management system to reference the specific information if said information is part of the first database, said data handling routines and the program interface of the billing and subscriber management system allowing the service provider to utilize an existing billing and subscriber management system in conjunction with enhanced services.

6. A system as recited in claim 5, the interactive subscriber services program having a program interface that allows the billing and subscriber management system to access and modify information from the second database, the billing and subscriber management system having provisioning routines that execute in response to data input by a customer service operator from the operator terminal to access or modify information from the second database using the program interface of the interactive subscriber services program.

7. A system as recited in claim 5, wherein the interactive subscriber services program caches information items from the first database that are used most frequently by the interactive application program.

8. A system as recited in claim 5, wherein the interactive application program maintains a cache of the most frequently accessed information items from the first and second databases.

9. A system as recited in claim 5, wherein the interactive application program specifies information items by ID numbers.

10. A system as recited in claim 9, wherein the interactive subscriber services program determines whether a specific information item is part of the first database by examining the ID number of the specific information item.

11. A system as recited in claim 9, wherein the interactive subscriber services program determines whether a specific information item is part of the first database by referencing one or more bits from the ID number of the specific information item.

12. A system as recited in claim 9, wherein the interactive subscriber services program determines whether a specific information item is part of the first database by comparing the ID number of the specific information item to a known range of ID numbers corresponding to information items from the first database.

13. A system as recited in claim 9, wherein the interactive subscriber services program determines whether a specific information item is part of the first database by referencing comparing the ID number of the specific information item against a list of ID numbers corresponding to information items from the first database.

14. A method of maintaining subscriber-related information in an interactive video entertainment distribution network comprising the following steps:

providing enhanced services and traditional video programming to subscribers through a subscriber interface device at the premises of an individual subscriber;

utilizing an existing billing and subscriber management system to maintain a first database with billing information regarding individual subscribers and with information regarding traditional video programming provided to such subscribers;

running an interactive subscriber services program in addition to the existing billing and subscriber management system to maintain a second database with information regarding enhanced services provided to individual subscribers, wherein the second database contains information not contained in the first database;

running an interactive application program on the subscriber interface unit of the individual subscriber, the interactive application program requesting references to information items through the interactive subscriber services program;

in response to a request by the interactive application program to reference a specific information item, the interactive subscriber services program referencing the first database if the specific information is in the first database maintained by the billing and subscriber management system, the interactive subscriber services program referencing the second database if the specific information item is in the second database maintained by the interactive subscriber services program.

15. A method as recited in claim 14 and further comprising:
adding a program interface to work in conjunction with the existing billing and subscriber management system to allow the interactive subscriber services program to access and modify information from the first database;
the interactive subscriber services program using the program interface of the billing and subscriber management system to reference the specific information item if said information item is part of the first database.

16. A method as recited in claim 14 and further comprising:
adding a program interface that works in conjunction with the existing billing and subscriber management system to allow the interactive subscriber services program to access and modify information from the first database;
the interactive subscriber services program using the program interface of the billing and subscriber management system to reference the specific information item if said information item is part of the first database;
implementing a program interface in the interactive subscriber services program that allows the billing and subscriber management system to access and modify information from the second database;
provisioning enhanced services for an individual subscriber from the interactive subscriber services program using the program interface of the interactive subscriber services program.

17. A method as recited in claim 14 wherein the interactive subscriber services program performs a step of caching information items from the first database that are accessed most frequently by the interactive application program.

18. A method as recited in claim 14 wherein the interactive application program performs a step of caching the most frequently accessed information items from the first and second databases.

19. A method as recited in claim 14 and further comprising:
specifying information items by ID numbers;
the interactive subscriber services program determining whether a specific information item is part of the first database by examining the ID number of the specific information item.

20. A method as recited in claim 14 and further comprising:
specifying information items by ID numbers;
the interactive subscriber services program determining whether a specific information item is part of the first database by referencing one or more bits from the ID number of the specific information item.

21. A method as recited in claim 14 and further comprising:
specifying information items by ID numbers;
the interactive subscriber services program determining whether a specific information item is part of the first database by comparing the ID number of the specific information item to a known range of ID numbers corresponding to information items from the first database.

22. A method as recited in claim 14 and further comprising:
specifying information items by ID numbers;
the interactive subscriber services program determining whether a specific information item is part of the first database by comparing the ID number of the specific information item to a list of ID numbers corresponding to information items from the first database.

* * * * *